US006941371B2

(12) United States Patent
Hartmann et al.

(10) Patent No.: US 6,941,371 B2
(45) Date of Patent: *Sep. 6, 2005

(54) SYSTEM AND METHOD FOR ENABLING GRAPHIC APPLICATIONS IN AN INTERACTIVE PROGRAMMING MODEL

(75) Inventors: Richard G. Hartmann, Endicott, NY (US); Daniel L. Krissell, Hallstead, PA (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 987 days.

This patent is subject to a terminal disclaimer.

(21) Appl. No.: 09/745,310

(22) Filed: Dec. 21, 2000

(65) Prior Publication Data

US 2001/0047417 A1 Nov. 29, 2001

Related U.S. Application Data

(63) Continuation-in-part of application No. 09/574,138, filed on May 18, 2000, now Pat. No. 6,738,817.

(51) Int. Cl.[7] .............................................. G06F 15/16
(52) U.S. Cl. ....................................... 709/227; 709/201
(58) Field of Search ................................. 709/201, 202, 709/204, 227–229

(56) References Cited

U.S. PATENT DOCUMENTS

| 5,511,002 A | * | 4/1996 | Milne et al. ................. 710/316 |
| 5,754,830 A |   | 5/1998 | Butts et al. .................. 395/500 |
| 5,893,053 A | * | 4/1999 | Trueblood .................. 702/187 |
| 5,899,990 A |   | 5/1999 | Maritzen et al. ................ 707/4 |
| 5,956,725 A |   | 9/1999 | Burroughs et al. ......... 707/101 |
| 5,960,200 A |   | 9/1999 | Eager et al. ................ 395/705 |
| 5,961,582 A | * | 10/1999 | Gaines .......................... 718/1 |
| 5,964,836 A | * | 10/1999 | Rowe et al. ................ 709/221 |
| 6,002,864 A | * | 12/1999 | Heyman ....................... 703/23 |
| 6,346,953 B1 | * | 2/2002 | Erlikh et al. ................ 345/762 |
| 6,502,131 B1 | * | 12/2002 | Vaid et al. .................. 709/224 |
| 6,658,625 B1 | * | 12/2003 | Allen ......................... 715/523 |
| 6,738,817 B1 | * | 5/2004 | Chen et al. ................. 709/227 |

OTHER PUBLICATIONS

J. Postel and J. Reynolds, Telnet Protocol Specification, Network Working Group, Request for Comments, RFC854, May 1983, 15 pages.

(Continued)

*Primary Examiner*—Bunjob Jaroenchonwanit
(74) *Attorney, Agent, or Firm*—Shelley M. Beckstrand

(57) ABSTRACT

Graphics enabled applications run on a text-based host server by allowing a client application running at a workstation to inform the server of this session (1) that it, the client application, is graphics capable and (2) the IP address and port(s) it is waiting on; and then by having the server set capability indicia, such as RAWT attributes, in the operating system for this session to indicate the (1) the client is graphics enabled, (2) the IP address and port(s) it is waiting on, (3) optionally, the path to an application to be automatically launched.

16 Claims, 7 Drawing Sheets

OTHER PUBLICATIONS

J. Postel and J. Reynolds, Telnet Option Specifications, Network Working Group, Request for Comments, RFC855, May 1983, 3 pages.

J. Postel and J. Reynolds, Telnet Binary Transmission, Network Working Group, Request for Comments, RFC856, May 1983, 4 pages.

J. Postel, Telnet End of Record Option, Network Working Group, Request for Comments, RFC885, May 1983, 2 pages.

J. VanBokkelen, Telnet Terminal–Type Option, Network Working Group, Request for Comments, RFC1091, Feb. 1989, 7 pages.

P. Chmielewski, 5250 Telnet Interface, Network Working Group, Request for Comments, RFC1205, Feb. 1991, 12 pages.

S. Alexander, Telnet Environment Option, Network Working Group, Request forComments, RFC1572, Jan. 1994, 7 pages.

* cited by examiner

SYSTEM AND METHOD FOR ENABLING GRAPHIC APPLICATIONS IN AN INTERACTIVE PROGRAMMING MODEL

RELATED APPLICATIONS

This application is a continuation-in-part (CIP), and as to common subject matter claims priority, of U.S. patent application Ser. No. 09/574,138 filed 18 May 2000 for "System and Method for Enabling Graphic Applications in an Interactive Programming Model", now U.S. Pat. No. 6,738,817 B1, issued 18 May 2004.

BACKGROUND OF THE INVENTION

1. Technical Field of the Invention

This invention pertains to client/server systems. More particularly, it relates to enabling graphical applications to run on a traditionally text based host.

2. Background Art

Many new software applications developed for the Internet are Java based, because Java is a prime operating system (OS) portability facilitator. Theoretically, a Java-based application can run on any Operating System unchanged, be it Windows95, Linux, OS/2, VM, etc. It also has the advantage of being able to tie into the Graphical User Interface (GUI) support of a host through an Abstract Window Toolkit (AWT), which is a standardized OS interface for application graphics support. (AWT is a product of Sun Microsystems.) Having GUI support enables the blending together of graphics and text from a variety of sources into one seamless screen or "panel", a highly desired attribute for any OS or application.

Unfortunately, many legacy application environments don't conveniently lend themselves to a GUI interface. Most of these legacy machines have added additional support consistent with the connectionless, stateless, http class of web servers. These Web based applications have to incorporate some method of state maintenance in order to mimmick a traditional connection and state oriented legacy programming model. These models are typically mainframe interactive. Many legacy applications can't really blend graphics and text very well—that is, until recent technology innovations have afforded some relief. For example, through use of Java applications great strides have been made in blending graphics and text.

IBM's AS/400 system legacy programming model has a text-only "green screen" interface (so named after the default color of text on the screen). This presents a problem porting popular Java applications to the AS/400, since many such applications require GUI support. Since the AS/400 system is a business computer, this means many businesses cannot easily migrate their legacy applications to their customers with a GUI interface. For example, suppose company ABC, Inc. offers customers terminal access to its AS/400 system and all the business applications installed on it, charging an hourly rate for connect time to use these applications. Customers connect to the AS/400 using a Telnet Client and get a text-only terminal emulator, at best. They cannot take advantage of GUI enabled Java applications that may be installed or ported over from other platforms.

IBM solved this problem on the AS/400 by adding Remote Abstract Window Toolkit support (RAWT). With Remote AWT, Java AWT graphical programs can be executed on a AS/400 system while remotely displaying the graphics.

The use of Remote AWT requires that Transmission Control Protocol/Internet Protocol (TCP/IP) be set up, and Sun Microsystems, Inc., Java Developer's Kit (JDK) 1.1.x installed on both the server AS/400 and the remote display. Any graphics-capable hardware, including IBM Network Station, can be used as a remote display for Remote AWT as long as it includes:

1) Graphics-capable hardware that runs Windows 95, Windows NT 4.0, Windows ME, Windows 2000, IBM Operating System/2 (OS/2), Sun Solar, Sun Solaris or AIX.
2) Configured hardware to access AS/400 with TCP/IP.
3) Java Developer's Kit 1.1.x (JDK 1.1.6 or later is recommended.)

AWT refers to Abstract Window Toolkit. The AWT is part of the Java Foundation Classes (JFC)—the standard API for providing graphical user interfaces (GUIs) for Java programs. This is a platform-independent windowing, graphics and user interface toolkit. With the Remote Abstract Window Toolkit (RAWT), a Java AWT graphical program can run on the AS/400 (a text-only platform) and display the graphics remotely. To use Remote AWT, the Transmission Control Protocol/Internet Protocol (TCP/IP) is set up, and Sun Microsystems, Inc., Java Developer's Kit (JDK) 1.1.x installed on the AS/400 and remote display.

As an example, this support is used to supply the interface for Operations Navigator, a remote configuration tool that ships free with every AS/400 as part of the 5769-XE1 Licensed Program Product, and allows AS/400 System Administrators to configure an AS/400 using a remote Windows 95/NT/2000 platform.

There are also Java-based terminal emulator clients, such as IBM's Host-On-Demand product. These are truly GUI clients, but they connect to the traditional TCP/IP Telnet Server, which primarily supports "green screen" applications. IBM's Network Station is similar, in that it is also a GUI capable client and can exploit tunneling of graphics from the integrated file system (IFS) on the AS/400, but this is not using Java virtual machine (JVM) capabilities on the AS/400. Further, Host-On-Demand must do many kinds of datastream conversions to work with a variety of Telnet Servers. For example, to communicate with OS/400 (AS/400), the Java client must convert 5250 datastreams into something the host GUI understands, in order for it to display on the client Operating System. Likewise, for VM systems (S/390) 3270 datastreams must be converted to host GUI. Replicating this across a few more platforms results in considerable code expansion in a Java-based client, if it is expected to support more than one platform.

Host-On-Demand supports "servlets", which are supposed to be Java applets that run on a server machine. But, by requiring a Host-On-Demand client, servlets cannot be exploited on Thin Clients, such as Network Stations.

The problem with using Operations Navigator to run Java applications is that it is a custom application, and requires a custom server on the AS/400 system to run the Remote AWT. There is no Internet standard or protocol by which graphical clients can connect to the AS/400 system and run the Remote AWT (and by extension, a Java application).

It is, therefore, an object of the invention to provide an improved system and method for enabling graphics enabled applications to run on a text based host.

It is a further object of the invention to provide a system and method whereby an AS/400 host can enable standard Telnet Clients to connect and be able to receive output from Java graphics applications.

It is a further object of the invention to provide a system and method for graphics enabled application platform independence for workstations by supporting a variety of clients and hardware.

It is a further object of the invention to provide an improved system and method for exploiting a Java virtual machine on a text based host system to run both text based and remote graphics applications, such as Java and X Windows applications.

It is a further object of the invention to provide a system and method for enhancing the ability of a text based host system to perform work management, including authentication, NLS, and job routing, for many clients at once.

It is a further object of the invention to provide an improved system and method for centralizing applications and support for applications.

It is a further object of the invention to provide an improved system and method for centralizing of backup/recovery processes.

It is a further object of the invention to provide an improved system and method for centralizing upgrades/fixes, such that such upgrades and fixes need be done only one time, not once for each workstation.

It is a further object of the invention to provide a system and method for comprising a single source for consulting, leasing, and marketing text based and graphical applications.

It is a further object of the invention to provide an system and method for supporting thin clients, such as network stations, by offloading CPU cycles workstations to a central mainframe.

It is a further object of the invention to provide an improved system and method for using existing terminal emulators which requires no new development and exploits existing standards, including Internet RFC'S.

SUMMARY OF THE INVENTION

In accordance with the system and method of the invention, a multimedia enabled application runs on a text based host. A client negotiates a connection with a server on a first port, and informs the server that the client is multimedia enabled and is listening on one or more additional ports for multimedia application data. Responsive thereto, the host establishes a multimedia connection from a virtual machine executing a selected application to the second port on the client for presentation of a multimedia application interface at the client.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, graphics enabled applications run on a text-based host server by allowing a client application running at, for example, a workstation to inform the server of this session (1) that it, the client application, is graphics capable and (2) the IP address and port(s) it is waiting on; and then by having the server set capability indicia, such as RAWT attributes, in the operating system for this session to indicate the (1) the client is graphics enabled, (2) the IP address and port(s) it is waiting on, (3) optionally, the path to an application to be automatically launched.

Depending upon the context, the terms "graphics" and "multimedia" are intended to encompass all forms of non-text data.

Figure 1:
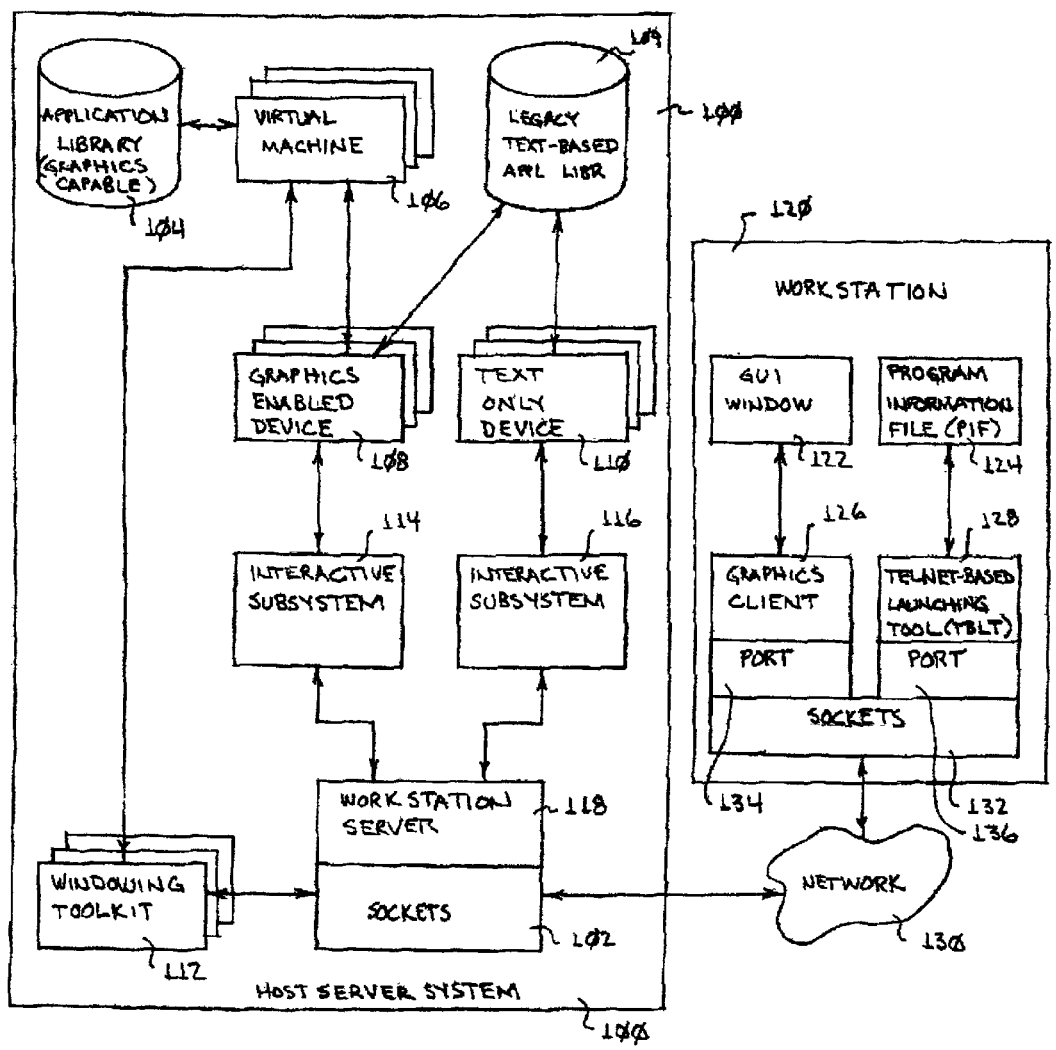
FIG. 1 is a system diagram illustrating the system of the invention for enabling graphics applications to run on a text-based host.

Referring to FIG. 1, a preferred embodiment of the system of the invention is shown. Host server system 100, such as an IBM AS/400 (TM) or System/390 (TM) system, includes a graphics/multimedia capable application library 104 and a text based application library 109, one or more virtual machines 106, one or more devices, such as graphics enabled devices 108 and text enabled devices 110, interactive subsystems 114, 116, workstation server 118 including sockets 102 interface to network 130, and windowing toolkit 112. Workstation 120 includes a display device capable of presenting GUI window 122, a Program Information File (PIF) 124, a graphics client application 126, a telnet-based program launching tool 128, ports 134 and 136, sockets 132 interface to network 130.

A launching tool, as used herein, refers to an a selectable element, such as an icon or entry in a pull-down menu, or the like, with associated information. The selectable element represents the program to be launched remotely on the server system. When a user at the client selects, such as by clicking on, the element, the launching tool obtains from, for example, a file the program name, directory, RAWT port—all information that is required at the server side to start the program. That information is passed to the server over the telnet connection. At the server, the program is loaded and executed.

Figure 2:
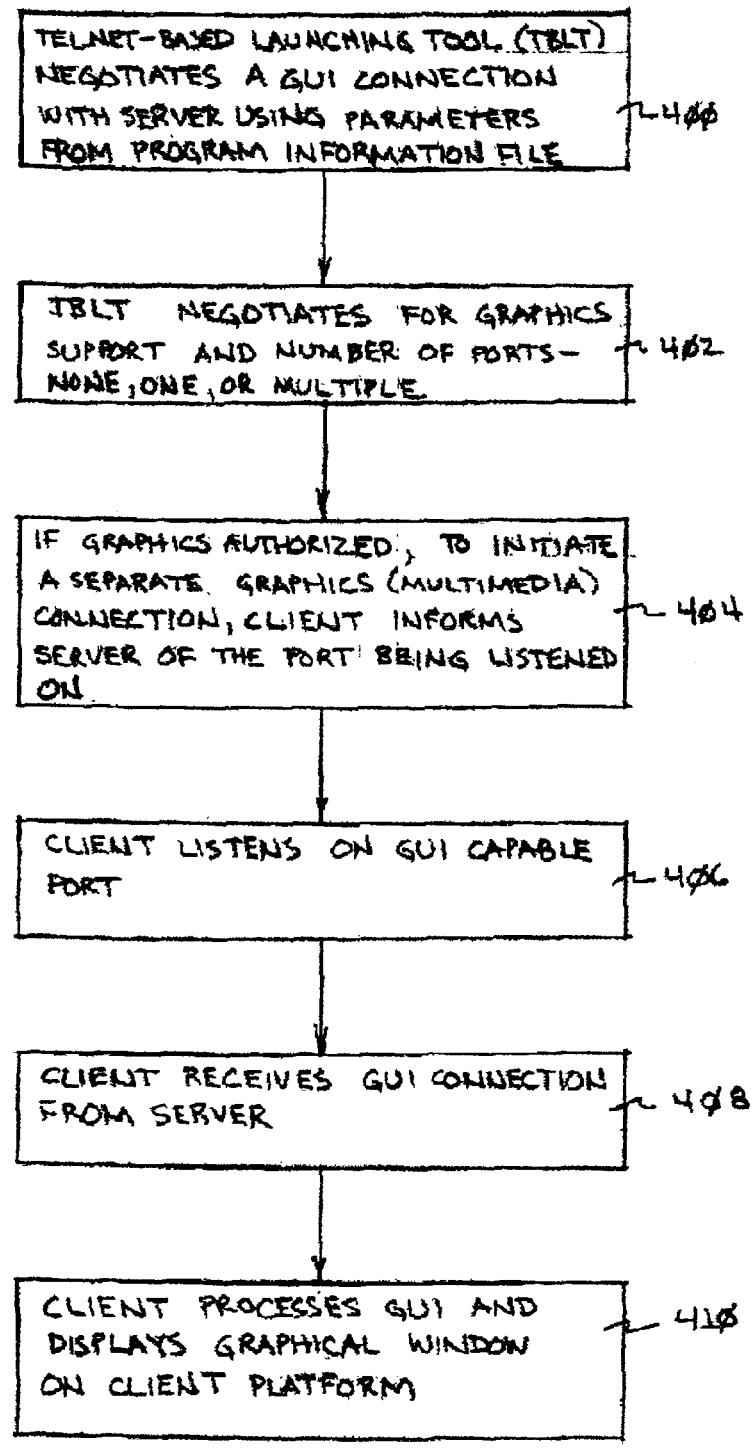
FIG. 2 is a flow diagram illustrating the steps executed at a client workstation to initiate a graphics session with a text-based host server.

Referring to FIG. 2, workstation 120 executes the following. In step 400 telnet-based program launching tool 128 negotiates from a given IP address and port 136 a connection to server system 100, negotiates for graphics support, and negotiates for a number of ports. In step 404, telnet-based program launching tool 128 informs workstation server 118 of the port 134 on which graphics client 126 is listening. In step 406, client 126 listens on GUI capable port 134. In step 408, client 126 receives a GUI connection from server 118. In step 410, the GUI is processed by graphics client 126 and displayed at GUI window 122. In accordance with this embodiment of the invention, a program that initiates remote execution from the client, rather than a full telnet client emulator, is all that is required.

Figure 3:
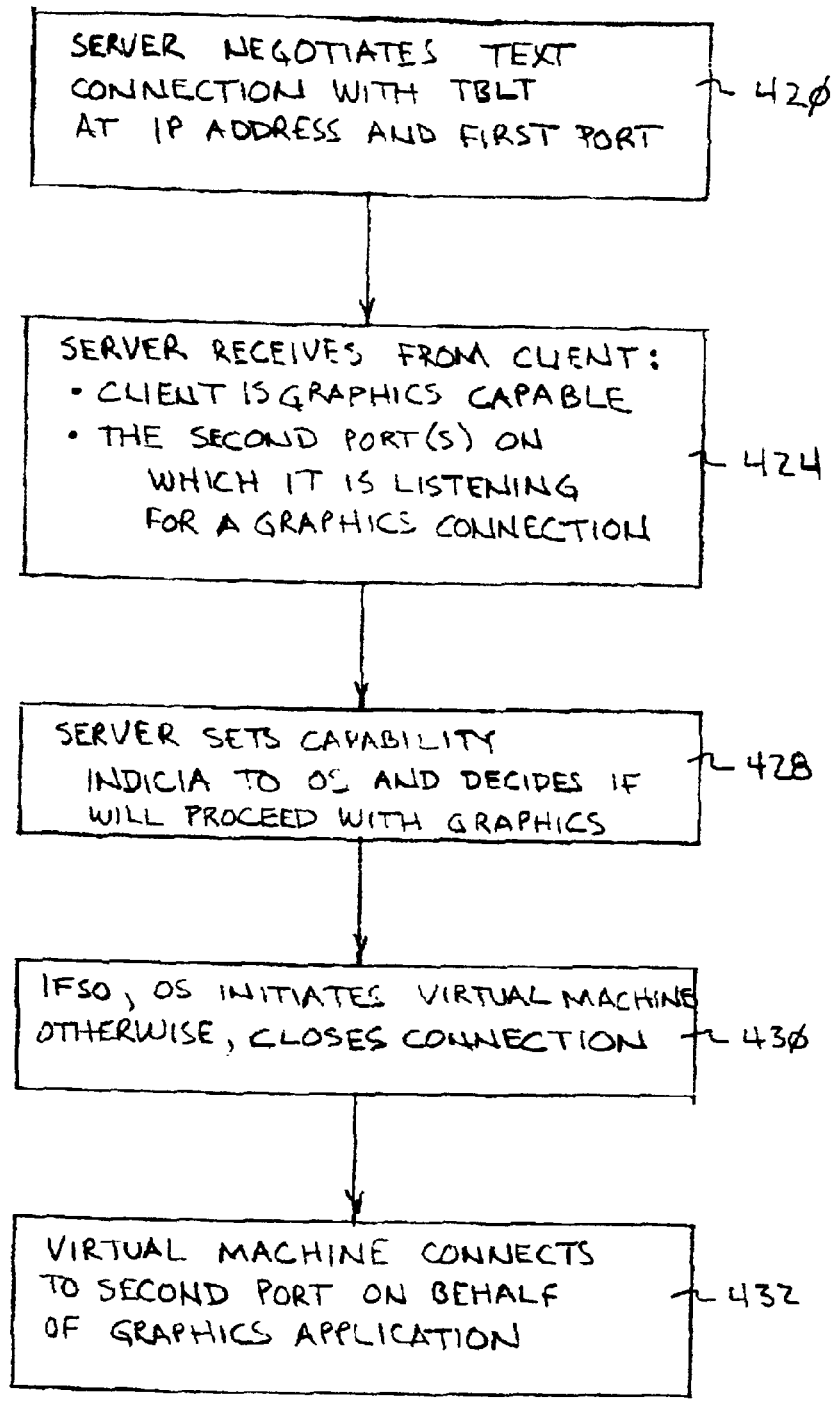
FIG. 3 is a flow diagram illustrating the steps executed at a text-based server responsive to a request from a graphics capable client for a graphics session.

Referring to FIG. 3, server system 100 executes the following. In step 420, server 118 negotiates a connection with telnet-based program launching tool 128 at a given IP address and port 136. In step 428, responsive to receiving in step 424 from telnet-based program launching tool 128 indicia specifying that workstation 120 is graphics capable and the port 134 on which graphics client 126 is listening, server 118 sets capability indicia in device space 108. In step 428, system 100 determines whether it will proceed with graphics processing and, if so, in step 432 initiates a virtual machine 106, and if not, the connection is closed. In step 430, virtual machine 106 connects through windowing toolkit 112 to port 134 of graphics client 126 and graphics window 122 on behalf of a selected application from library 104. If a virtual machine 106 is initiated, graphics capable applications from library 104, are processed by graphics enabled device 108, with communication to workstation 120 port 134 via windowing toolkit 112. If a virtual machine is not initiated, the connection is closed.

Figure 4:
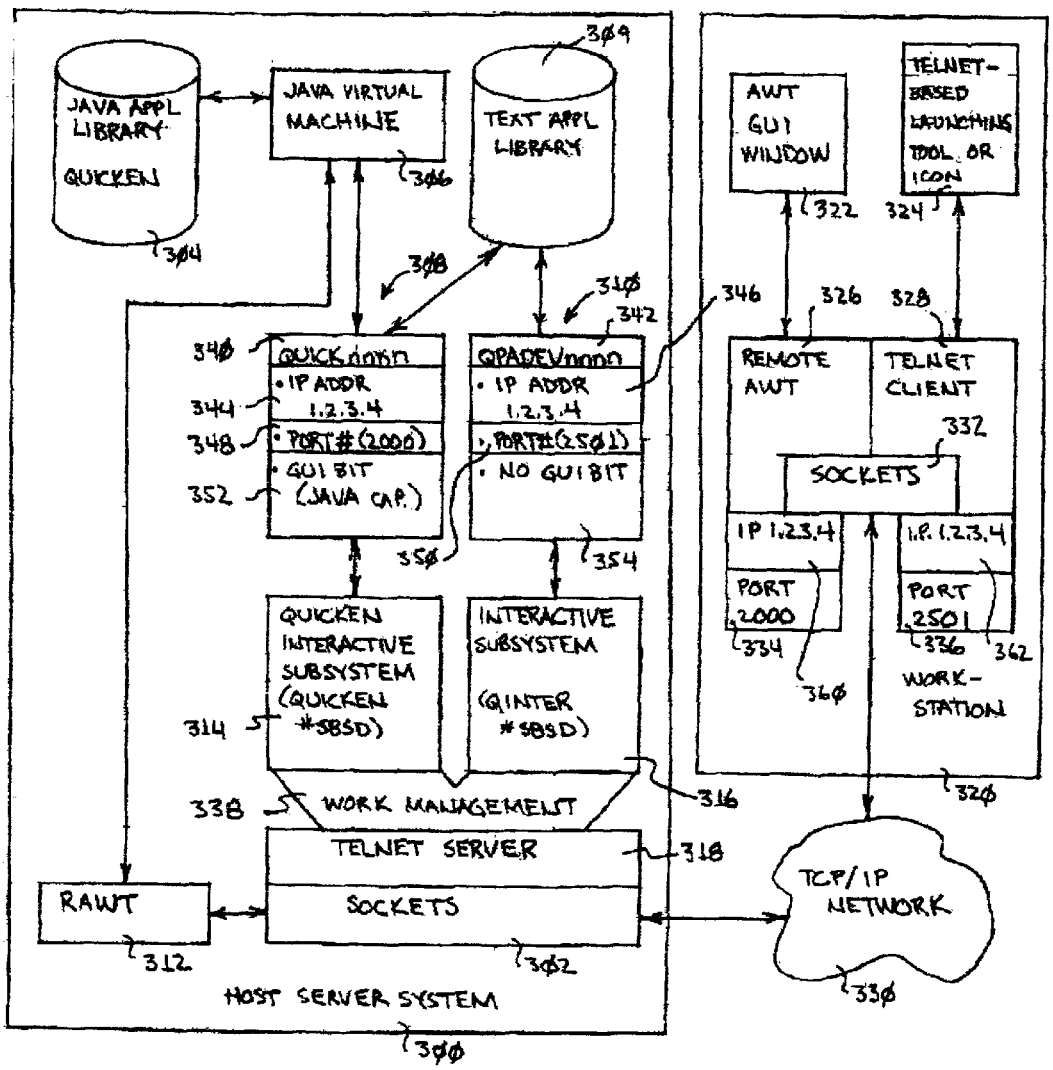
FIG. 4 is a system diagram illustrating a more detailed, exemplary embodiment of the system of the invention.

Referring to FIG. 4, in accordance with a preferred, more specific embodiment of the invention, by using the existing TN5250E support, Telnet Clients configured with Remote AWT 326 (the requirements for which are discussed above) are enabled to negotiate a graphical Java run-time session over port 334 from any graphical workstation 320.

Figure 5:
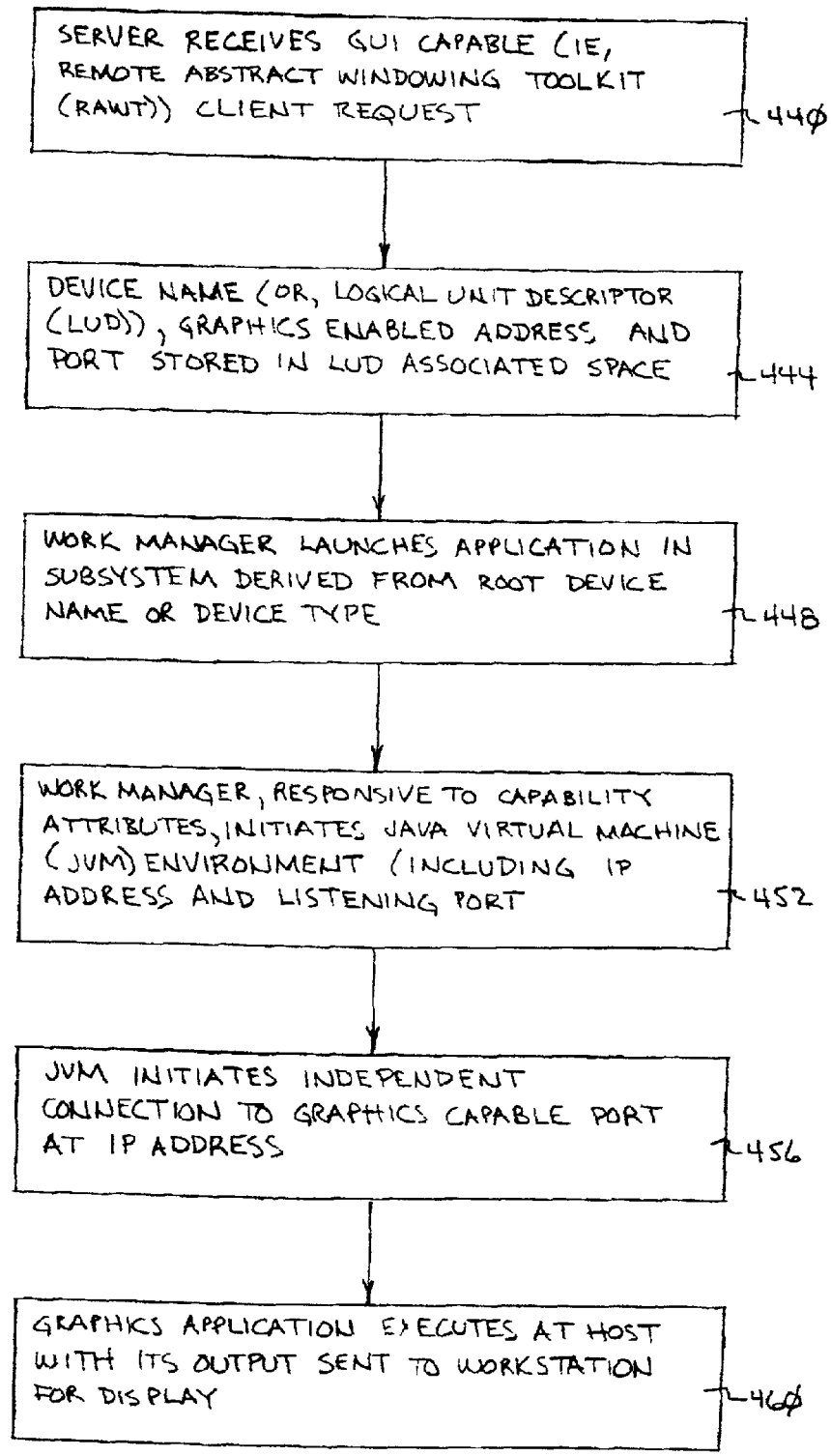
FIG. 5 is a flow diagram illustrating in greater detail the method steps executed by a text-based host server according to the exemplary embodiment of FIG. 4.

Referring to FIG. 5 in connection with FIG. 4, in operation, workstation server, such as an IBM AS/400 or System/390 Telnet Server 318, receives from a text enabled client, such as a telnet-based program launching tool 328, a request to operate in a graphics enabled terminal-type mode. This is done by subnegotiation of user variables (USERVAR) in step 440. In this example, the USERVAR "IBMRAWTADDR", "IBMRAWTPORT", and, optionally, "IBMRAWTAPPL" are those applicable to Remote AWT. Other graphics, or multimedia, capable applications, such as X Windows, may require negotiation of other user variables.

Figure 6A:
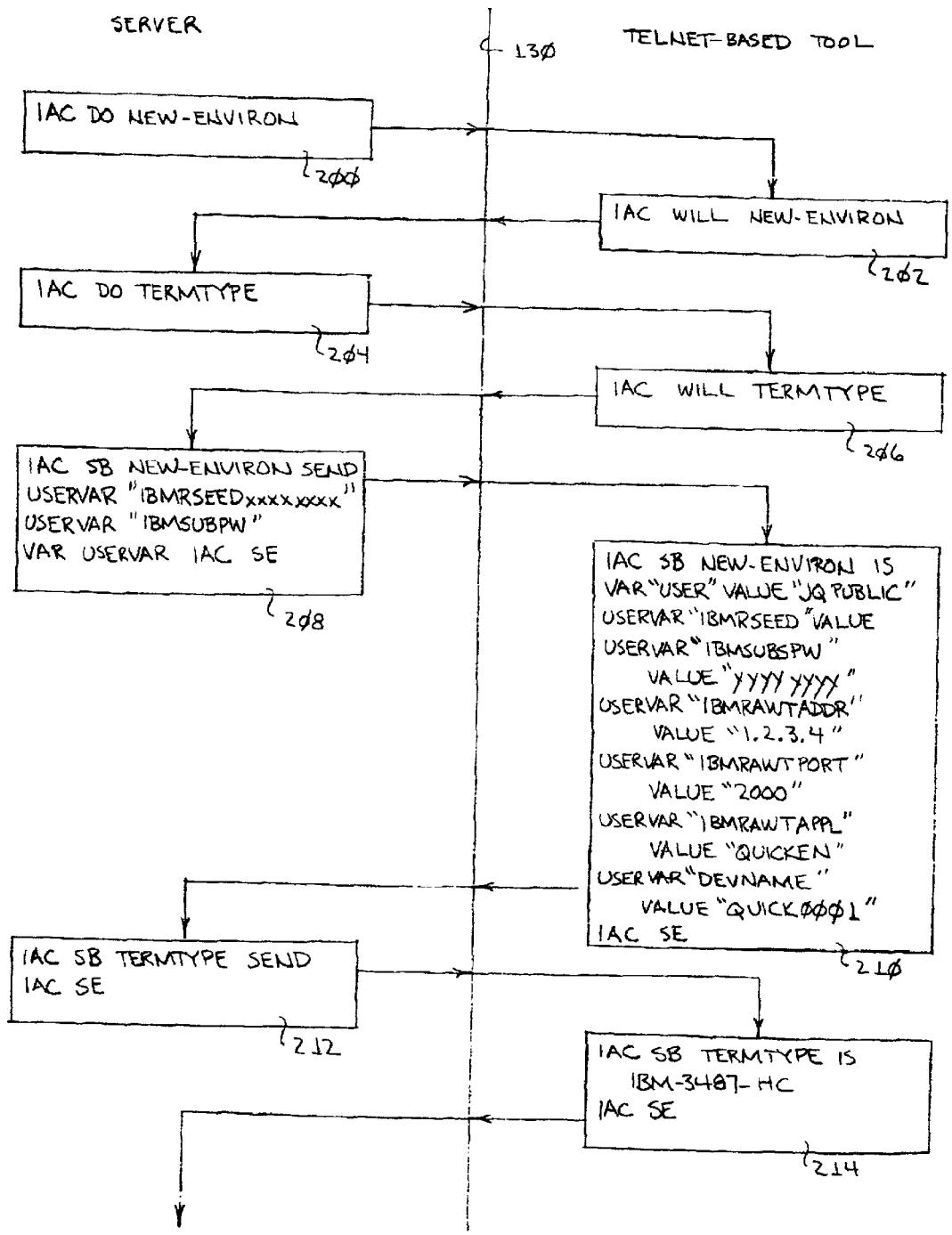
FIGS. 6A–6B are a flow diagram illustrating the session negotiation protocol of the exemplary embodiment of the invention.
Figure 6B:
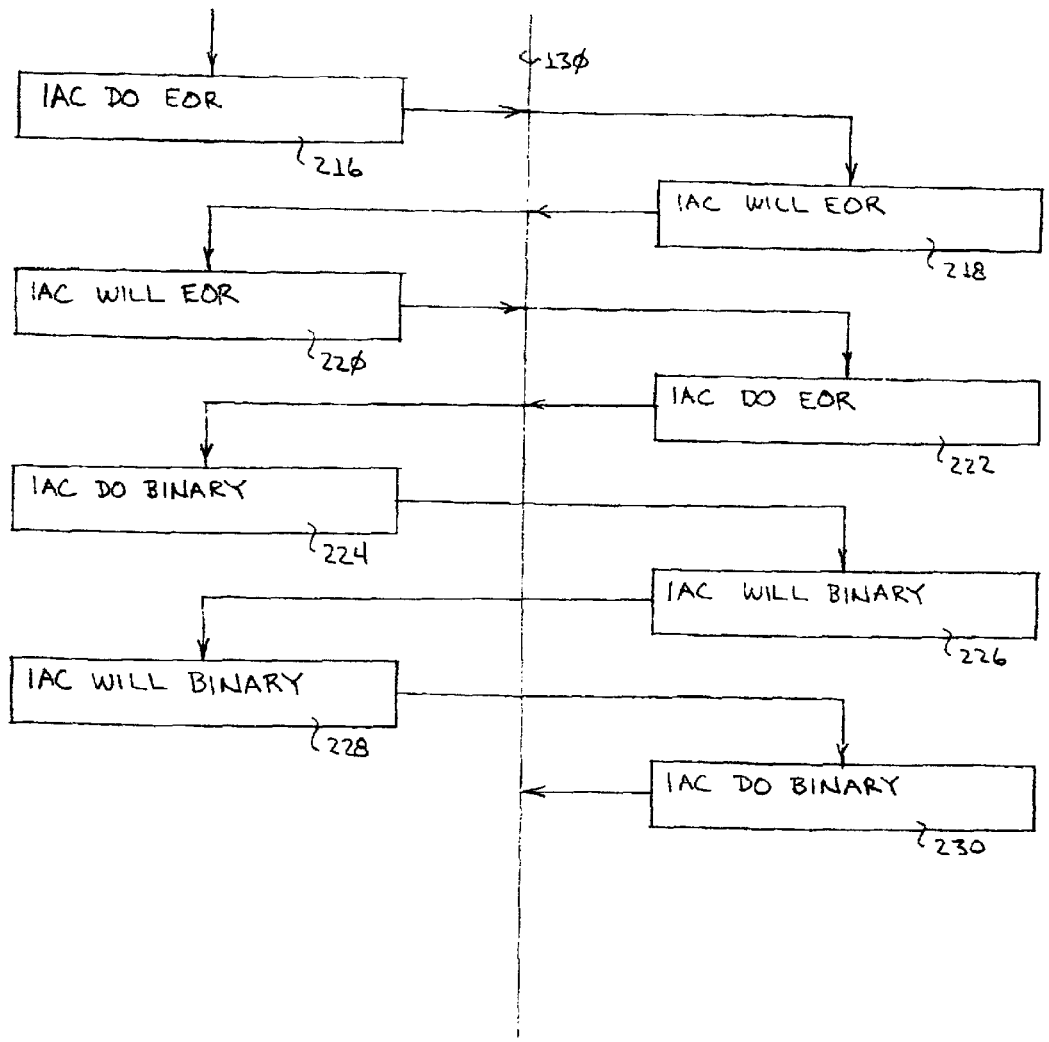

Referring to FIG. 6, an example of step 440 negotiation is set forth. In this example a traditional Telnet handshake is done in steps 200, 202, 204, 206, 208, 216, 218, 220, 222, 224, 226, 228, 230 with Telnet server 318 to negotiate terminal-types (for a session at IP address 362 1.2.3.4 and port 336 2501) with the AS/400 Telnet Server 318 in accordance with the TN5250E Internet-draft, along with standard Internet RFC 1205 (5250 Telnet Interface), RFC 854 (Telnet Protocol Specification), RFC 855 (Telnet Option Specifications), RFC 856 (DO BINARY), RFC1091 (Terminal Type), RFC 885 (End of Record) and RFC 1572 (New Environment option) being used. In FIG. 6, IAC means "interpret as command", SB means "subnegotiation", and SE means "subnegotiation end".

In accordance with this exemplary embodiment of the invention, when Telnet server 318 receives in step 210 (FIG. 6A) the three RAWT user VARS (port, address, and application), in step 444 (FIG. 5) the Telnet server 318 selects a virtual terminal device 308 (herein named QUICKnnnn 340, for example) for that session, and marks the device 308 as GUI capable. It does so by storing the values received in step 210 for the IBMRAWTADDR (IP address 360 value is '1.2.3.4') and IBMRAWTPORT (port value 334 is '2000') USERVARs into Logical Unit Device Associated Space (LUD ASP) 308 as IP address 344 and port 348, along with indicia 352, such as a bit flag, to indicate this session is operating from a GUI capable workstation 320. This GUI flag bit 352 can be used later by other processes on the host system 300, such as Work Management. In this example, the client 328 optionally requested in step 210 the application 304 QUICKEN, by sending the IBMRAWTAPPL USERVAR. In the absence of any application request, a default application such as a Java menu may be selected, which may optionally list all or some subset of available applications.

In this example, in step 448, Telnet User Exit Programs (not shown) can be configured to read the VAR and USERVAR values being sent in step 210, and select appropriate device name 340, sign-on user profile and program-to-launch values to kick off the Java application 304 requested. For example, since the application being requested in step 210 is QUICKEN, the User Exit Programs can be set to assign a free device name 340 such as QUICK0001, which will automatically route the associated job to a dedicated sub-system QUICKEN 314. Work Management 338 manages this routing, selecting the appropriate subsystem 314, 316 when a client session is started. The User Exit Programs can further set the user profile to be QUICKUSR and the Java program-to-launch to be QUICKPGM. In this way, the User Exit Programs fully control the authority granted telnet-based program launching tool 328 to any libraries, including Java libraries 304 and text libraries 309, and programs on the AS/400 server system 300.

In step 452, responsive to a Telnet server 318 session initiation, a Virtual Terminal Manager (VIM) 306 initiates an interactive client job. Telnet server submits QUICK0001 device name 340, QUICKUSR profile and QUICKPGM program in the request sent to Work Management 338. At session initialization time, Work Management 338 initiates an interactive job using these values, bypassing the traditional, such as 5250, Sign-On panel, and launching the QUICKPGM application 304 in the Java Virtual Machine (JVM) 306. The user profile and program-to-launch can also be obtained from TN5250E negotiations rather than User Exit Programs, if host system 300 is configured that way.

Alternately, Telnet Server 318 lets Work Management 338 read the GUI bit 352 out of the QUICK0001 LUD ASP 308 and decide whether to launch a Java environment or do the default action of sending a text based, such as 5250, sign-on panel to window 324.

If a Java Virtual Machine (JVM) 306 environment is launched for the interactive session, in step 456 it will connect to the IP address 360 and port 334 extracted from the LUD ASP fields 344, 348, respectively, and establish a connection with the Remote AWT workstation client 326. Once connected, in step 460 the graphical output of the JVM environment and QUICKEN application is seen on the remote workstation in the AWT window 322. This will implement what is, in effect, a Java GUI terminal on the client workstation 320. If a plurality of ports 334 are authorized, a plurality of interactive subsystems 314 and applications 308 may be associated with those ports.

Referring again to FIG. 4, Remote AWT 326 is a Remote Abstract Windowing Toolkit (RAWT) client displaying graphical and text output from Java virtual machine 306 via RAWT 312. During display via RAWT 312, the session with the telnet-based program launching tool 328 may be suspended or hidden, and restarted upon termination application 308. Server 318 receives from workstation 320 the 'RAWT VAR's and USERVAR's under RFC 1572, and selects QUICKnnnn device 308, storing GUI bit 352, IP address 344, and port 348 in LUD associated space. Subsystem 314 receives from work management the device name 340 for virtual device 308. Work management 338 sees the RAWT attribute 352 in LUD 308, and optionally initiates the Java virtual machine 306 environment. JVM 306 connects to IP address 360 and port 334. Output from QUICKEN Java application 304 can now be seen on window 322 at workstation 320 client 326.

Referring further to FIG. 4, by way of example, in order to use a Java QUICKEN financial application 304 being made available by an enterprise to anyone on the Internet on a per hour charge basis, first a telnet-based program launching tool 328 connects to the Telnet Server 318 using the sample TN5250E Telnet negotiations in connection with FIG. 6. For simplicity, Telnet Server 318 uses User Exit Programs to select device name 340 QUICK0001 for this client 328. (At this point, standard negotiations are still underway.) The values of IBMRAWTADDR and IBMRAW-TPORT USERVAR's are stored into LUD ASP fields 344, 348, respectively for device 308 QUICK0001 and a request issued to initiate the Work Management process that starts the interactive client job. Work Management 338 is configured such that any devices 308 named QUICKnnnn are to be routed to special subsystem QUICKEN 314 for processing. This subsystem 314 is set up to launch the Java Virtual Machine 306 for every QUICKEN interactive job. JVM 306 connects via RAWT 312 back to the workstation RAWT port 334 using the IP address 360 and port 334 values stored in the LUD ASP fields 348, 352 for device 308 QUICK0001 and starts the QUICKEN application 304 automatically.

In accordance with alternative embodiments of the invention, many other applications in addition to QUICKEN can be offered. Further, rather than launching a single application, a menu of available Java applications can be launched. Or a menu of available languages can be launched, and so forth.

Advantages over the Prior Art

It is, therefore, an advantage of the invention that there is provided an improved system and method for enabling graphics enabled applications to run on a text based host.

It is a further advantage of the invention that there is provided a system and method whereby an AS/400 host can enable standard Telnet Clients or Telnet-based tools to connect and be able to receive output from Java graphics applications.

It is a further advantage of the invention that there is provided a system and method for graphics enabled application platform independence for workstations by supporting a variety of clients and hardware.

It is a further advantage of the invention that there is provided an improved system and method for exploiting a Java virtual machine on a text based host system to run both text based and remote graphics applications, such as Java and X Windows applications.

It is a further advantage of the invention that there is provided a system and method for enhancing the ability of a text based host system to perform work management, including authentication, NLS, and job routing, for many clients at once.

It is a further advantage of the invention that there is provided an improved system and method for centralizing applications and support for applications.

It is a further advantage of the invention that there is provided an improved system and method for centralizing of backup/recovery processes.

It is a further advantage of the invention that there is provided an improved system and method for centralizing upgrades/fixes, such that such upgrades and fixes need be done only one time, not once for each workstation.

It is a further advantage of the invention that there is provided a system and method for comprising a single source for consulting, leasing, and marketing text based and graphical applications.

It is a further advantage of the invention that there is provided an system and method for supporting thin clients, such as network stations, by offloading CPU cycles workstations to a central mainframe.

It is a further advantage of the invention that there is provided an improved system and method for using existing terminal emulators or Telnet-based tools, which requires no new development and exploits existing standards, including Internet RFC'S.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A data processing system, comprising
   a text-based host including a workstation server;
   a workstation including a graphics capable client;
   a graphics application on said host;
   said client being operable for negotiating a connection with said host on a first port;
   said client being further operable for informing said workstation server that said workstation is graphics enabled and that said graphics capable client is waiting on a second port;
   said workstation server being operable for establishing a connection to said second port for communication between said graphics application and said graphics client.

2. The data processing system of claim 1, said workstation further including a graphical user interface for interfacing between a user and said graphics capable client on behalf of said graphics application.

3. The data processing system of claim 2, said client being a Telnet-based client, said graphical application being a Java graphical application, and further comprising:
   a Java Virtual Machine for executing said graphics application;
   a windowing toolkit responsive to IP address and port attributes from said Telnet-based client for establishing at least two independent connections to the IP address of said workstation, at least one of said independent connections being from said Java Virtual Machine to said graphics enabled client.

4. The data processing system of claim 3, further comprising a Java Virtual Machine and virtual device support for a plurality of client and hardware configurations, thereby providing application platform independence for a plurality of workstation architectures.

5. The data processing system of claim 4, further comprising:
   a plurality of graphical applications for performing language and work management functions;
   said Java Virtual Machine and virtual device support providing language and work management functions simultaneously for a plurality of workstation clients.

6. The data processing system of claim 5, said text-based host providing a centralized store and support for a plurality of text-based applications and graphics-based applications.

7. The data processing system of claim 6, said applications including applications for executing backup and recovery processes.

8. The data processing system of claim 6, said text-based host further providing for centralized upgrading of said applications applicable to all workstations without requiring routine upgrading of hardware or software of said workstations.

9. The data processing system of claim 6, said text-based host providing a single source for application service providers, including consulting, leasing, and marketing text based and graphical applications.

10. The data processing system of claim 2, said text-based host providing support for thin clients having graphical capability.

11. A data processing system, comprising:
   a text based host system;
   a Java virtual machine on said text based host system for executing both text based and graphical applications;
   a workstation server on said host system for connecting said host system to a plurality of ports at a client workstation, at least one of said ports interfacing a graphical client and another of said ports interfacing a Telnet-based client; and
   said Telnet-based client for negotiating a connection with said host system on a first of said ports and informing said host that said workstation is multimedia enabled and a multimedia enabled client at said workstation is listening on at least a second port for multimedia application data;
   said host selectively establishing a multimedia connection from a virtual machine executing a selected application to said second port on said client for presentation of a multimedia application interface at said client.

12. System for executing multimedia applications on a text based host for input/output with respect to a multimedia enabled workstation, comprising:
   a library of multimedia enabled applications;
   a Telnet-based client for negotiating a connection with said host on a first enabled port and informing said host that said workstation is multimedia enabled and a multimedia enabled client at said workstation is listening on at least one second port for multimedia application data;
   said host selectively establishing a multimedia connection from a virtual machine executing a selected application to said second port on the client for presentation of a multimedia application interface at said multimedia enabled client.

13. System for executing multimedia applications on a text based host for input/output with respect to a multimedia enabled workstation, comprising:
   a library of multimedia enabled applications;
   a server for negotiating a connection with a Telnet-based client at said workstation on a first enabled port and receiving from said Telnet-based client indicia specifying that said workstation is multimedia enabled and a multimedia enabled client at said workstation is listening on at least one second port for multimedia application data; and
   said host selectively establishing a multimedia connection from a virtual machine executing a selected application to said second port at said workstation for presentation of a multimedia application interface at said multimedia enabled client.

14. Method for executing multimedia applications on a text based host for input/output with respect to a multimedia enabled workstation, comprising the steps of:
   negotiating a connection with a Telnet-based client at said workstation on a first enabled port;
   receiving from said Telnet-based client indicia specifying that said workstation is multimedia enabled and a multimedia enabled client at said workstation is listening on at least one second port for multimedia application data; and
   selectively establishing a multimedia connection from a virtual machine executing a selected application to said second port at said workstation for presentation of a multimedia application interface at said multimedia enabled client.

15. A program storage device readable by a machine, tangibly embodying a program of instructions executable by a machine to perform method steps executing multimedia applications on a text based host for input/output with respect to a multimedia enabled workstation, said method steps comprising: negotiating a connection with a Telnet-based client at said workstation on a first enabled port;
   receiving from said Telnet-based client indicia specifying that said workstation is multimedia enabled and a multimedia enabled client at said workstation is listening on at least one second port for multimedia application data; and
   selectively establishing a multimedia connection from a virtual machine executing a selected application to said second port at said workstation for presentation of a multimedia application interface at said multimedia enabled client.

16. A computer program for executing the steps comprising:
   negotiating a connection with a Telnet-based client at said workstation on a first enabled port;
   receiving from said Telnet-based client indicia specifying that said workstation is multimedia enabled and a multimedia enabled client at said workstation is listening on at least one second port for multimedia application data; and
   selectively establishing a multimedia connection from a virtual machine executing a selected application to said second port at said workstation for presentation of a multimedia application interface at said multimedia enabled client.

* * * * *